United States Patent
Huang

(10) Patent No.: US 8,416,596 B2
(45) Date of Patent: Apr. 9, 2013

(54) SWITCHING POWER CONTROLLER AND SYSTEM

(75) Inventor: Yu Mei Huang, Shanghai (CN)

(73) Assignee: Giantec Semiconductor Ltd. Inc., Shanghai (CN)

( * ) Notice: Subject to any disclaimer, the term of this patent is extended or adjusted under 35 U.S.C. 154(b) by 418 days.

(21) Appl. No.: 12/911,448

(22) Filed: Oct. 25, 2010

(65) Prior Publication Data

US 2011/0096574 A1 Apr. 28, 2011

(51) Int. Cl.
*H02M 3/335* (2006.01)

(52) U.S. Cl.
USPC ............... 363/97; 363/21.11; 363/21.18

(58) Field of Classification Search ........ 323/282, 323/284; 363/21.01, 21.04, 21.08, 21.09, 363/21.1, 21.11, 21.12, 21.156, 21.17, 21.18, 363/97

See application file for complete search history.

(56) References Cited

U.S. PATENT DOCUMENTS

| | | | |
|---|---|---|---|
| 7,480,159 B2* | 1/2009 | Wei et al. | 363/21.18 |
| 7,616,461 B2* | 11/2009 | Yang et al. | 363/56.1 |
| 8,120,931 B2* | 2/2012 | Chang et al. | 363/21.07 |
| 2011/0044076 A1* | 2/2011 | Zhang et al. | 363/21.17 |
| 2011/0096574 A1* | 4/2011 | Huang | 363/21.18 |
| 2012/0169313 A1* | 7/2012 | Lee et al. | 323/282 |
| 2012/0250368 A1* | 10/2012 | Balakrishnan et al. | 363/21.17 |
| 2012/0300508 A1* | 11/2012 | Fang et al. | 363/21.17 |

* cited by examiner

*Primary Examiner* — Jeffrey Sterrett
(74) *Attorney, Agent, or Firm* — Yuan Qing Jiang

(57) ABSTRACT

A switching power controller circuit comprises a first terminal pin for a high potential of a power supply for the controller circuit, a second terminal pin for providing output of switch drive signals and for receiving feedback signals, and a third terminal pin for receiving external current signals and for a low potential of the power supply. The switching power controller further comprises a clock generator, a pulse width modulation (PWM) generator, a reference generator, a power switch driver, a feedback signal sampler, a PWM comparator and a floating sampler.

9 Claims, 14 Drawing Sheets

SWITCHING POWER CONTROLLER AND SYSTEM

FIELD OF INVENTION

The present invention is directed to integrated circuits (IC), more particularly, the invention relates to switching power controller chip and pin-multiplexed method employed by the chip.

BACKGROUND OF INVENTION

Due to many advantages comparing to conventional linear power, such as higher efficiency, lower stand-by power, lower cost, and smaller size and so on, switching mode power supply (SMPS) is increasingly extending to various electronic devices.

FIG. 1 illustrates a basic principle diagram for a current mode SMPS system which is the most widely used power supply in current time. The system comprising: a switching power converter 100, a switching power controller 120, and a feedback network 140. The switching power converter 100 includes a power input port 102 and a power output port 104. The switching power converter and the switching power controller interact by switching control signal and current control signal. The feedback signal is fed into the switching power controller 120 from feedback network 140. Function of the system is: converting the AC or DC power input from the port 102 into DC or AC power that meet specially defined specifications and outputting from the port 104.

In FIG. 1, switching power converter generally comprising: magnetic energy storage component (for example transformer or inductor), power switching device (for example power MOSFET or power BJT), power diodes and filter capacitors. Controlled by switching control signal, power switching device is periodically turned on or turned off. Wherein switching control signal usually is pulse width modulation (PWM) or pulse frequency modulation (PFM) signal, it also may be a combination of PWM and PFM. Pulse width of switching control signal defines the "on" time of power switch in a period, and combines with switching frequency to control power transformed from power input port to power output port, that is output power of the SMPS system. In the context of this patent application, the switch control signal is referred as PWM signal.

Taking AC-DC current mode SMPS as an example, in order to be capable of achieving constant output voltage level at different load condition, it is necessary to adjust switching frequency and (or) pulse width of the switching control signal in real-time, thus controlling output power of the SMPS system. As illustrated in FIG. 1, feedback network 140 samples the output power signal and generates feedback signal which is sent into the switching power controller 120. Meanwhile, the current control signal output from the switching power converter also flows into switching power controller 120. Jointly manipulated by the feedback signal and the current control signal, pulse width or (and) frequency of the switching control signal is modulated, thus obtaining output power matching with output load.

In order to more clearly describe operation principle of SMPS, a traditional flyback SMPS system diagram (including control IC diagram) is illustrated in FIG. 2. With reference to FIG. 2, the flyback SMPS system is widely used in various electronic devices in which electrical isolation between the power input stage and the power output stage is needed. As illustrated in FIG. 2, all nodes marked as "ground" are connected together electrically and act as the lowest reference potential of the power input stage. Similarly, all nodes named "VN" are connected together electrically, and act as the lowest reference potential of the power output stage. The so called electrical isolation is just the isolation between "ground" and "VN". This specification mentioned above is applied to FIGS. 2, 4, 5. Such switching power system is applied at some fields as AC-DC or DC-DC adapters, chargers of portable electronic devices (for example mobile phones), LED drivers and so on. The SMPS system in FIG. 2 includes: a switching power converter 200, a switching power controller IC 220, a feedback network 240, an input EMI filter 260, an input rectifier 280, a start-up resistor R1, a Buck capacitor C1, a rectifying diode D1 for powering the controller IC, a decoupling capacitor C2 for power supply of the controller IC, a sensing resistor RS for sensing the current control signal and an output load RL.

Flyback switching power converter illustrated in dashed box of FIG. 2 comprising: an isolation transformer (TX), a power rectifying diode D2, a filter capacitor C3 and a power switch (SW). One end of primary winding (PRE) of the transformer connects to LINE input voltage, produced by an EMI filter 260 and a bridge-rectifier 280 operating on an AC input voltage; another end of primary winding of the transformer is connected to one end of a power switch SW. The other end of the power switch is connected to ground (GND) via a resistor RS. Rs acts as converting the current signal of the primary winding (PRE) into a voltage signal and send the voltage signal to switching power controller 220 as a current control signal. When power switch (SW) turns on, the LINE voltage is forced on the primary side of the transformer (TX) and energy is stored into primary side of the transformer (TX) when the current in primary winding linearly increases; when power switch (SW) turns off, the stored energy is transferred to secondary side of the transformer (TX), therefore the energy is passed to output load. Flyback switching power converter includes two operation modes: discontinue current mode (DCM) and continue current mode (CCM). Wherein DCM is: that the energy stored in primary winding during power switch turn-on will be completely transferred to load of the secondary winding during power switch turn-off; CCM is: that the energy stored in primary winding will be partly transferred to load of the secondary winding during power switch turning-off. For convenience, the following descriptions of the application will adopt DCM as examples, but it is easily to understand that the switching power converter described in the context of this patent application may also operate on CCM.

To ensure output voltage can still maintain constant under controlled conditions even if load $R_L$ is changed, it is necessary to sample output voltage in real time. The sampled output voltage generates a feedback signal ($S_{FB}$) through a feedback network 240, and then $S_{FB}$ flows into switching power controller IC 220. By processing $S_{FB}$ and current control signal of the primary winding of transformer (TX), the switching power controller IC generates power switch control signal $V_{GATE}$.

The switching power controller IC 220 illustrated in FIG. 2 contains 5 terminal pins: VDD, GND, FB, CS, and GATE. VDD (power supply) and GND (ground) are respectively connected to chip power supply and system ground generated by system to provide stable working power supply for chip. The pin of FB is connected to feedback network 240 to receive feedback signal $S_{FB}$ from feedback network 240, and the pin of CS is connected to resistor $R_s$ to receive the current control signal $V_{CS}$ that is generated on resistor $R_s$ by the primary winding (PRE) of the transformer. Pin GATE is connected to the controlling terminal of power switching (SW). Chip 220 consists of the following main blocks: a UVLO (under voltage lock out) circuit 221, a LDO (low dropout regulator) 222, testing controller 223, a clock generator 224, a PWM generator 225, a power switching driver 226, a reference circuit 227, a PWM comparator 228 and a feedback signal processor 229. The working fundamental of chip 220 is: the feedback signal $S_{FB}$ is processed by the feedback processor 229 to generate two signals of $S_{FM}$ and $V_{th}$. At the dynamic reference threshold of PWM comparator 228, $V_{th}$ is compared with $V_{CS}$ introduced through pin CS, then the output signal $C_{cnt}$ of PWM comparator 228 is sent to the PWM generator 225 to control the on/off of PWM signal; $S_{FM}$ is sent to clock generator 224 to control the frequency of clock, and then to control the frequency of PWM signal further.

The timing sequence of controller is illustrated in FIG. 3. The phase and the pulse width of the power switch control signal $V_{GATE}$ is essentially the same as that of the PWM_P. The difference between the power switch control signal VGATE and the PWM_P signal is the amplitude of pulse and driving capability. The generation procedure of power switching control signal $V_{GATE}$ described in FIG. 3 is as the following:

1. The falling edge of clock signal triggers PWM_P turning high, and PWM_N signal turning low, at this time point, the power switch begins to turn on.
2. Turn-on of power switching leads to the current in primary winding of the transformer increasing linearly, and $V_{CS}$ increasing linearly also.
3. When the amplitude of Vcs reaches that of PWM comparator threshold $V_{th}$, the PWM comparator outputs logical high, PWM_P becomes low and PWM_N signal becomes high, which leads to the power switch cut off.
4. Cut-off of the power switch leads to $V_{CS}$ signal returning to zero and PWM comparator outputs logical low.

FIG. 3 shows that PWM_P and PWM_N are a pair of compensative pulse signals, When PWM_P is high, power switching is on; while PWM_N is high, power switching is off.

There are two typical methods for feedback implementation employed by flyback switching power converter: one is secondary winding feedback of transformer (TX); the other is primary winding feedback of transformer. As for secondary winding feedback of transformer is concerned, the feedback network, the error amplifier and the compensation network all are at the secondary winding side of the transformer, the feedback signal is coupled to primary stage through electronic isolation device—opto-coupler (an optical-electronic coupler). A typical flyback SMPS system based on secondary winding feedback of transformer is shown in FIG. 4.

A typical flyback SMPS system based on primary winding feedback of transformer is shown in FIG. 5. In this system, feedback network consists of an auxiliary winding AUX of transformer and a pair of divider resistors $R_1$ and $R_2$. In the period from the power switch turning-off to power diode D2 of the secondary winding turning-off, output voltage is mapped to auxiliary wind. The divided auxiliary winding voltage is sent to FB pin of power controller chip as feedback signal.

For most of flyback SMPS system used to drive MOSFET power switch, voltage imposed on pin of VDD is set from 14 V to 20 V, the voltage of pin GATE is set from 12 V to 18 V, and the signal amplitudes of CS and FB are smaller than 5 V based on the consideration of system design. Therefore, in order to save cost (a high voltage device may consume a larger chip area) and to optimize performance (a low voltage device is easy to meet matching requirement, and the acquired gain is higher), inner circuits related to VDD and GATE are designed with high voltage device that can endure up to 50V power supply; meanwhile the circuits related to CS and FB is designed with low voltage device that can work at power supply from 9 to 14v. For this reason, VDD and GATE are called high-voltage pins; CS and FB are called low-voltage pins. This kind of pin setting brings some potential risk, for example, if high-voltage pins of VDD and GATE happen to be shorted with low-voltage pins of CB and FB, inner devices involved with low-voltage pins may be break-down and damaged. Especially, when VDD, connected with capacitor $C_2$ (4 μF~10 μF) with a large amount of stored energy, is shorted with CS and FB, electric charges stored in C2 are discharged rapidly through low-voltage pins, which possibly causes permanent damage to inner low-voltage circuits. In SMPS system, most failures are caused by the electric discharge as described in a situation due to above reason.

The other potential risk is the negative pulse between pins of CS and GND. At the moment of MOSFET power switch turn-off, most of negative charges in conducting channel of the switch are discharged into GND through resistor Rs, as a result, an instantaneous negative voltage spike is generated between pins of CS and GND. When this negative voltage spike is larger than the forward threshold voltage of PN junction, latch-up will happen possibly in the controller chip, causing the controller chip works abnormally or fails.

BRIEF DESCRIPTION OF THE DRAWINGS

Features and advantages of embodiments of the present disclosure will become apparent by reference to the following detailed description and drawings, in which like reference numerals correspond to similar, though not necessarily identical components. For the sake of brevity, reference numerals or features having a previously described function may not necessarily be described in connection with other drawings in which they appear.

DETAILED DESCRIPTION OF THE INVENTION

Figure 1:
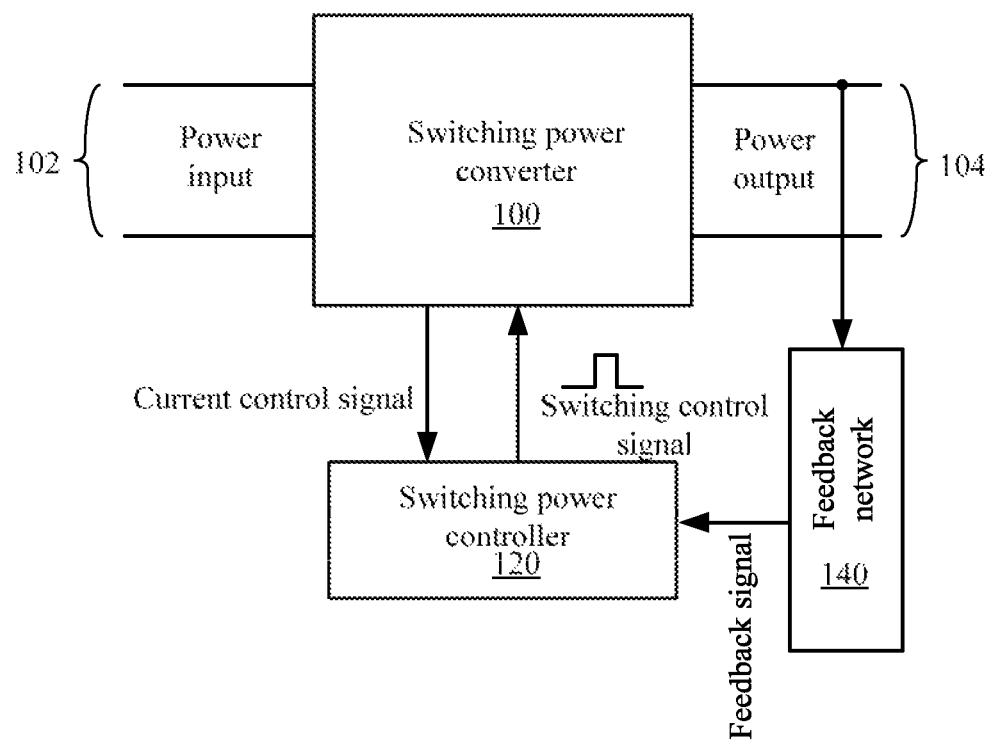
FIG. 1 illustrates a basic principle block diagram for up to date current-mode switching mode power system.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

According to one embodiment of the present invention, terminal pins (sometimes referred as pins) of a switching power controller IC are multiplexed to overcome the risks existing in traditional circuits. Reducing the number of terminal pins of an IC chip reduces the packaging cost. In order to achieve terminal pin multiplexing, the elements of the controller IC are re-configured and the architecture and connections of the current-mode switching mode power system (SMPS) are re-designed.

In one embodiment of the invention, a switching power controller circuit comprises a first terminal pin VDD for a high potential of a power supply for the controller circuit, a second terminal pin GAFB for providing output of switch drive signals and for receiving feedback signals, and a third terminal pin VSS for receiving external current signals and for a low potential of the power supply. The switching power controller further comprises a clock generator, a pulse width modulation (PWM) generator, a reference generator, a power switch driver, a feedback signal sampler, a PWM comparator and a floating sampler. Said clock generator provides clock signals. Said PWM comparator outputs a PWM triggering signal. A first input of the PWM generator is coupled to the clock generator to receive the clock signals and a second input of the PWM generator is coupled to the PWM comparator to receive the PWM triggering signals from the PWM comparator. A first output and a second output of the PWM generator provide a pair of PWM signals to the power switch driver, optionally, a third output of the PWM generator provides a feedback sampling controlling signal (Samp2) to feedback signal sampler. Inputs of the power switch driver are coupled to the PWM generator to receive PWM signals and an output of the power switch driver provides switch driving signals to the second terminal pin. A first input of the feedback signal sampler receives a feedback signal from the second terminal pin (GAFB), and optionally a second input of the feedback signal sampler is coupled to the PWM generator to receive the feedback sampling controlling signal (Samp2) from the PWM generator. A first input of the feedback signal processor is coupled to the output of the feedback signal sampler to receive sampled feedback signals, a second input of the feedback signal processor receives a reference voltage or reference current from the reference generator, and a first output of the feedback signal processor is coupled to the floating sampler and provides a threshold voltage signal therein. A first input of the PWM comparator is coupled to the third terminal pin VSS and a second input of the PWM comparator is coupled to the floating sampler. The floating sampler comprises a switch K1 and a holding capacitor Ch. The switch is connected between the output of the feedback signal processor and the second input of the PWM comparator, wherein when the switch is on, the feedback signal processor provides the threshold voltage signal to the second input of the PWM comparator and charges the holding capacitor until the signal level of the switch driving signal output from the power switch driver changes to high; the holding capacitor is connected between the high potential of the power supply and the second input port of the PWM comparator to hold the threshold voltage when the switch is off. The output of the power switch driver is set to a high-impedance state at least for a period when the feedback signal sampler is receiving feedback signal.

Figure 6:
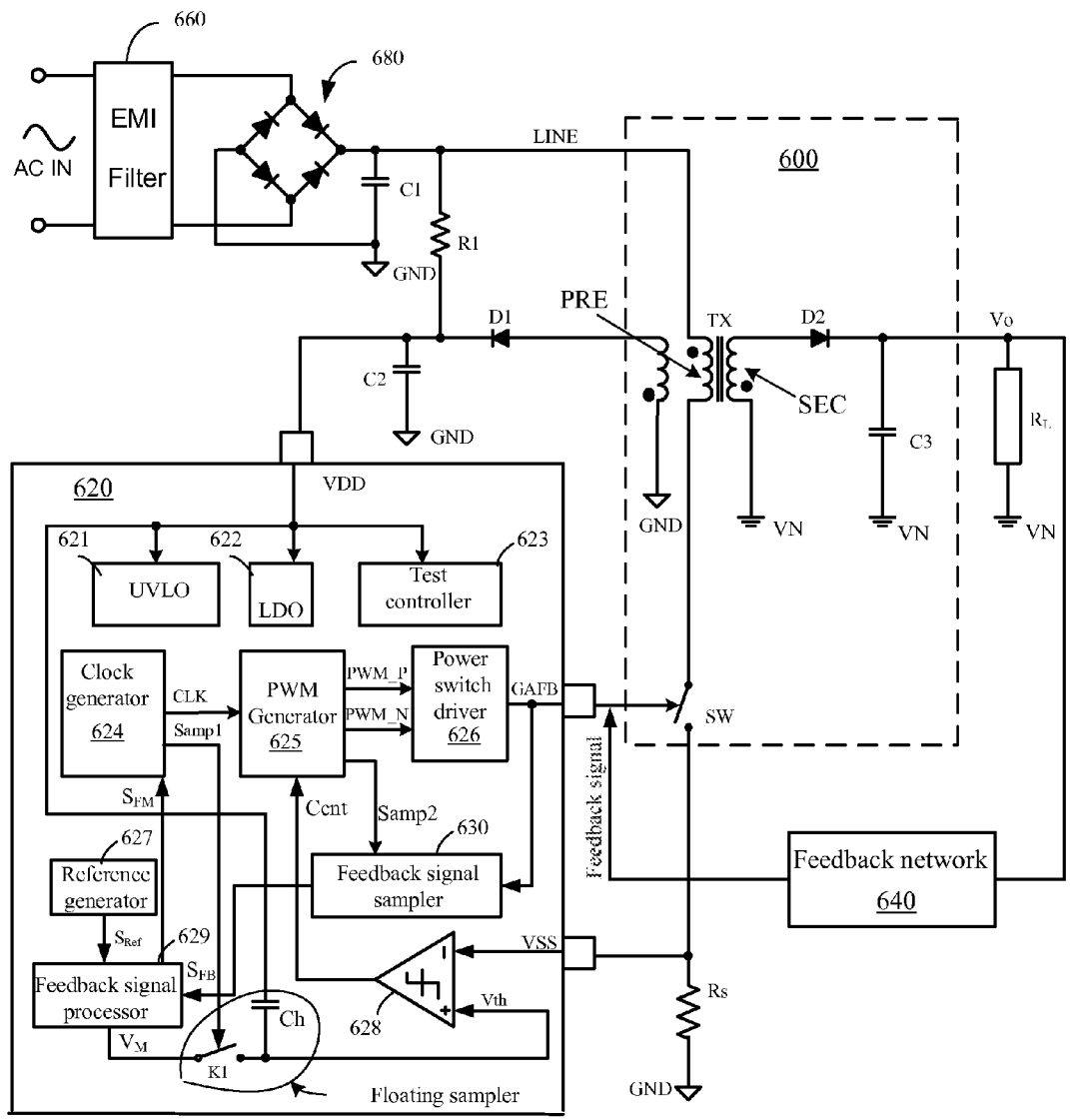
FIG. 6 depicts operation principle of a switching power controller IC according to the present invention.

FIG. 6 illustrates operation principle of a switching power controller IC and configurations of SMPS. In the system shown in FIG. 6, electrical isolation between the power input stage and the power output stage is necessary in order to minimize noise level of the output. All nodes marked as "GND" or "ground" are connected together electrically and act as the lowest reference potential of the power input stage. Similarly, all nodes named "VN" are connected together electrically, and act as the lowest reference potential of the power output stage. The term, electrical isolation, is the isolation between node "GND" (or "ground") and "VN". The terms described above apply to the entire specification of this application. As shown in FIG. 6, SMPS comprises: a switching power converter 600, a switching power controller IC 620, a feedback network 640, a current signal sensing resistor Rs, an EMI filter 660 and a bridge-rectifier 680. The switching power convert 600 includes a power input port, a power output port, a current signal output port and a switching signal input port. The power input port receives power signal from the bridge-rectifier 680. The power output port connects to a load $R_L$. The current signal output port sends a current signal to Terminal Pin VSS of the switching power controller IC 620 and the current signal sensing resistor Rs. The switching signal input port connects with Pin GAFB of the switching power controller IC 620 and the feedback network 640 feeds a feedback signal into Pin GAFB of the switching power controller IC 620 from power output port.

Figure 2:
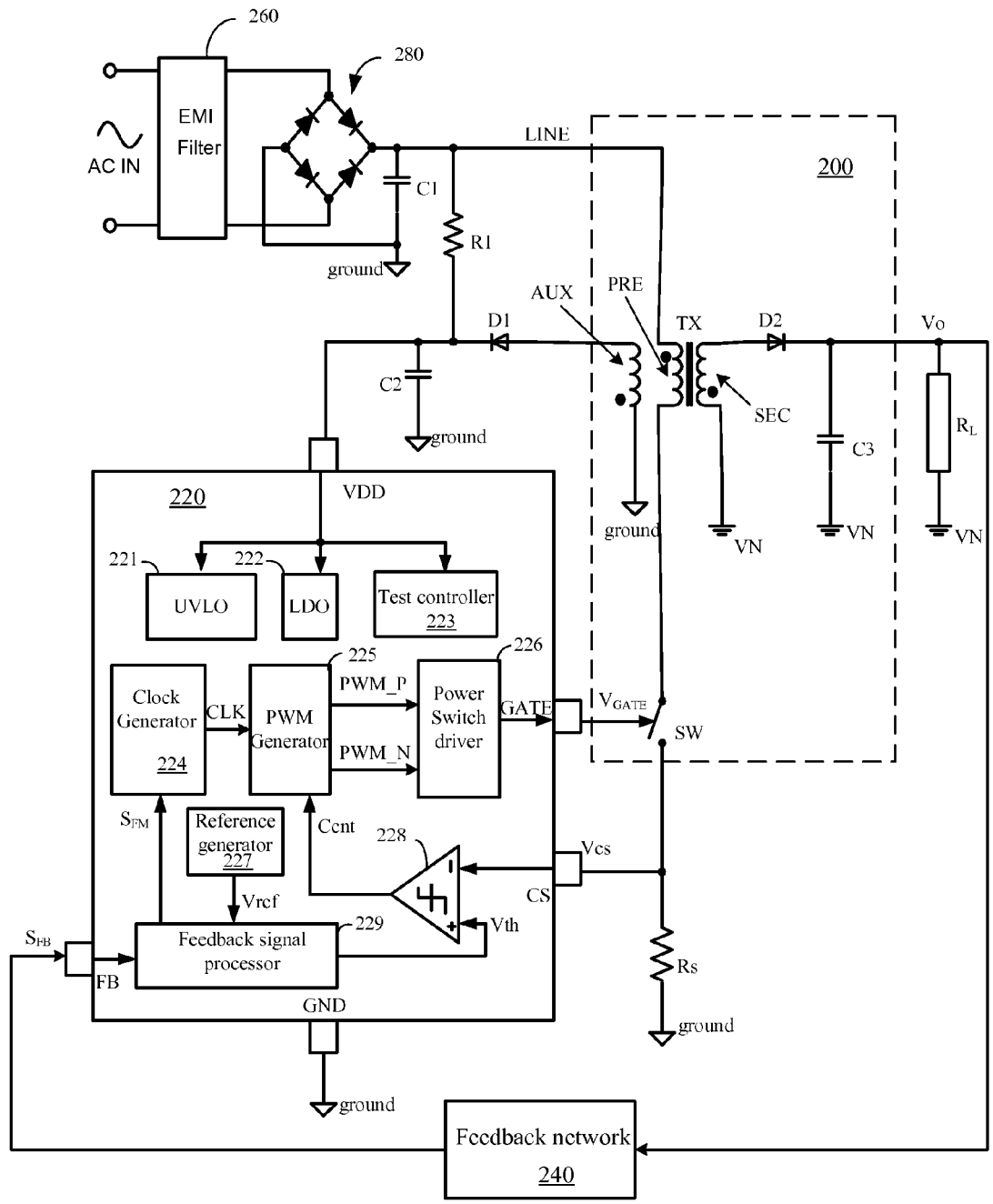
FIG. 2 illustrates a traditional diagram for flyback switching mode power system with its controller IC.

Referring again to FIG. 6, there are three terminal pins of the switching power controller IC 620. The function configuration for terminal pins of controller IC 620 and system linkage are described as the following. Inside the controller IC 620, there are a UVLO (under voltage lock out) circuit 621, a LDO (low dropout regulator) 622, a testing controller 623, a clock generator 624, a PWM generator 625, a power switch driver 626, a reference generator 627, a PWM comparator 628, a feedback signal processor 629 and a feedback signal sampler 630. Compared with the traditional 5-pin controller IC 220 in FIG. 2, the controller IC 620 has only 3 terminal pins, VDD, GAFB, and VSS. In one embodiment, the voltage imposed on terminal pin VDD is set from 14 V to 20 V, the voltage of terminal pin GAFB is set from 12 V to 18 V, and the signal amplitudes of VSS are smaller than 5 V based on the consideration of system design. Inner circuits related to VDD and GAFB are designed with high voltage devices that can endure up to 50V power supply; meanwhile Pin VSS acts as the lowest reference potential of all inner circuits. In this example, 3 pins can provide all the functions provided by the former 5 pins of traditional power controller IC. In FIG. 2, the only function of Pin GATE is to drive the external power MOS switch, and the only function of Pin FB is to sense the feedback signal of output, but in FIG. 6, Pin GAFB provides dual-functions that Pin GATE and Pin FB provide. Therefore, from system point of view, the new Terminal Pin GAFB is actually an input/output terminal. GAFB is not only connected with the controlling terminal of the power switch to control the power switch; it is also connected with feedback network to sample the feedback signal under the controlling of inner timing sequence. Terminal Pin VSS in FIG. 6 is connected to GND through resistor Rs, and the effect of Rs is to transfer the current signal of the transformer primary winding to voltage signal when power switch SW is on. Terminal Pins VDD and VSS can provide those functions traditionally offered by 3 pins: VDD, GND and CS. In traditional controller IC 220 of FIG. 2, the only effect of pin VDD is to offer power supply for controller IC, pin GND is used to connect IC ground with system one, and the effect of pin CS is to sense and receive the current signal of the primary winding. It is necessary to note especially that due to the high voltage pin of GAFB, all of devices inside the IC connecting directly with GAFB should be high voltage devices.

It can be seen clearly in FIG. 6 that Terminal Pin VSS is not only the common "ground" inside the controller IC 620, but also the receiving terminal for the primary winding current. One function of Terminal Pin VDD is the power supply pin of the controller IC. At the same time, VDD can also provide a floating reference voltage level for IC. When the power switch SW turns on, the voltage at Pin VSS increases linearly with the current of transformer primary winding increasing. As a result, all of the voltage levels in IC 620 referred to the IC ground increase gradually with the VSS voltage. If the threshold voltage $V_{th}$ of PWM comparator 628 is still inducted directly from feedback signal processor, then $V_{th}$ increases with VSS and PWM comparator 628 can not change, the result of which is that the PWM signal can not be generated correctly (PWM signal means the two paths control signal output from PWM generator: PWM_P, PWM_N). To ensure PWM comparator 628 working well, it is needed that the input threshold $V_{th}$ of feedback signal processor 629 is kept constant referred to system "ground" during the conductance of power switch. In one embodiment, the present invention provides a floating level sampling technique to solve the problem mentioned above.

In order to realize the floating level sampling technique, 4 basic elements are necessary: a sampling switch, a holding capacitor, a controlling signal for sampling switch and a floating reference voltage level. In controller IC 620 of FIG. 6, sampling switch K1 is connected between the output of feedback signal processor 629 and the input of PWM comparator 628. The controlling signal for switch K1, Samp1, comes from clock generator 624. The holding capacitor Ch is connected between the positive input terminal of PWM comparator 628 and Terminal Pin VDD. The first terminal pin of the switching power controller circuit is coupled to a system ground (marked as GND in FIG. 6) through a capacitor. As shown in FIG. 6, Pin VDD is linked with system "ground" by a large capacitor C2, and VDD is used to provide the floating reference voltage level.

According to the present invention, various devices besides a passive capacitor can be used as the holding capacitor. For instance, the holding capacitor can be a MOS transistor.

In one embodiment, the PWM signals of the switching power controller circuit include a first PWM signal; the power switch driver is controlled to provide driving signals to the second terminal pin when the logic level of the first PWM signal is high; the clock generator provides a first sampling signal to control the switch; the frequency of the first sampling signal is synchronous with the first PWM signal; when the logic level of the first sampling signal changes from high to low, the logic level of the first PWM signal changes from low to high.

Figure 7:
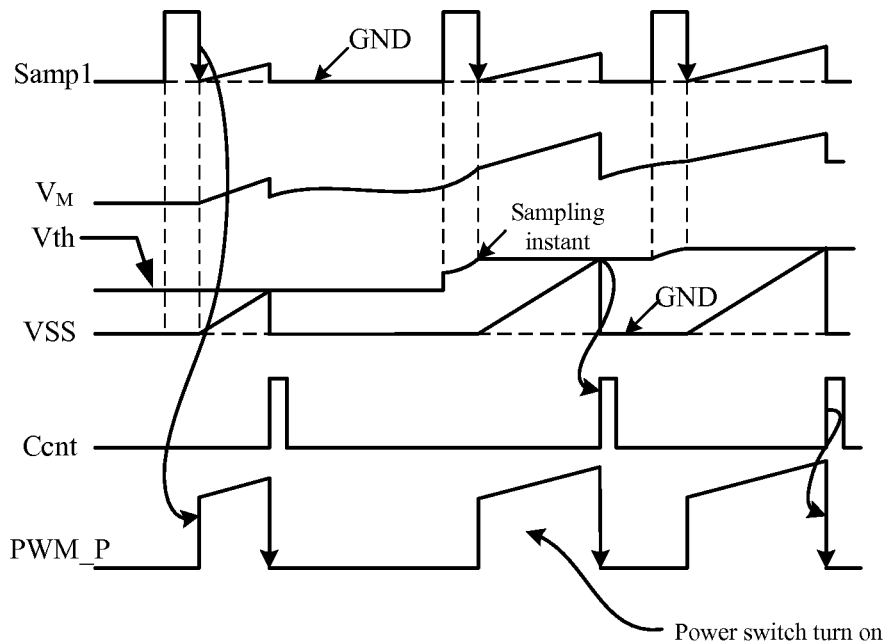
FIG. 7 illustrates timing diagram of floating sampling for controller IC in FIG. 6.

Illustrated in FIG. 7 is the timing sequence of the floating sampling process in controller IC 620. The working principle and implementation of the floating sampling technique is described based on this timing sequence. The timing of sampling controlling signal Samp1 is synchronized with that of the CLK signal (in different application, the timing of sampling controlling signal Samp1 can be asynchronous with that of CLK signal), and Samp1 should complete sampling (logic level of Samp1 is high or low) before PWM signal turns on. When logic level of Samp1 is high, switch K1 is on, the output of feedback signal processor 629 is connected with holding capacitor Ch and the "+" input terminal of PWM comparator 628, the electric potential of holding capacitor is forced to equal to that of the output of feedback signal processor 629. When logic level of Samp1 signal is low, switch K1 turns off, at this time, the electric potential of "+" input terminal of 628 is hold by the electric charge stored in Ch, the value of this potential is equal to the output of feedback signal processor 629 at the moment of K1 turns-off (the sampling instant). Pin VDD is connected with "ground" through a big capacitor C2, so the diode D1 is reverse-biased when power switch SW is on (PWM_P is a positive pulse), and the net current out of C2 is equal to the current through VDD minus the current of resistor R1, and its value is about 1 mA for the designed controller IC. In general, the duration of switch turn-on is less than 10 μs, and the capacitance of C2 is around from 4 μF to 10 μF. Therefore, during SW turning-on, the potential drop of C2 is less than 2 mV, it is reasonable to consider that the floating reference potential provided by VDD is almost constant in the presence of power switch turning-on. The bottom plate (the side of the plate of Ch which is connected to K1) of capacitor Ch located inside the controller IC 620 has no any discharge path when sampling switch K1 is off, the voltage of Ch can be kept constant when sampling signal Samp1 level is low. As a result, while power switch stays on, though chip ground VSS increases linearly with the current of the transformer primary winding increasing, the input threshold of PWM comparator 628 (equal to floating reference potential provide by VDD at the sampling instant minus voltage of Ch) keeps constant based on the system "ground". When the value of VSS reaches this threshold, PWM comparator 628 generates a control signal Ccnt, which can make PWM_P level become low, causing the power switch off.

As for the above floating sampling technique, there is a resistor between the common "ground" VSS of IC and system "ground" GND. Therefore, the IC ground is not the same as that of the system. Illustrated in FIG. 7, during the turning-on of power switch, the potential difference between the common "ground" VSS of IC and system "ground" GND may increase linearly. But the voltage level of VSS is always the lowest inside IC, and the voltage level of all inner nodes referred to VSS change synchronously with the same amplitude as the potential of VSS changes, which is equivalent to adding an offset voltage between "ground" of the controller IC (VSS) and the "ground" of the system.

The basic principle of terminal pin multiplexing is to set the output of the power switch driver to a high-impedance state during the period the feedback signal being sampled based on a internal logic control for non-overlapping of the timing sequence of the switch driving signal and the feedback sampling signal. Therefore the feedback signal can be correctly sampled without interference, and then the sampled feedback signal is further fed into internal signal process circuits. As illustrated in FIG. 6, the PWM_P, PWM_N signal generated by PWM generator is fed into the power switch driver, and output of the switching driver is connected with the control terminal of power switch by pin GAFB; meanwhile, the feedback signal output from the feedback network is also sent into the feedback signal sampler inside the controller IC by pin GAFB.

In an alternative embodiment, the switching power controller circuit includes a first PWM signal, PWM_P, a second PWM signal, PWM_N, and optionally, a third feedback sampling controlling signal (Samp2); the logic level of the first PWM signal and the logic level of the second PWM signal are different from each other except when both of them are logic low; the power switch driver is controlled to provide driving signals to the second terminal pin when the logic level of the first PWM signal is high; the feedback signal sampler is controlled by the feedback sampling controlling signal (Samp2) to receive feedback signals from the second terminal pin when the logic levels of both the first PWM signal and the second PWM signal are low. The feedback signal sampler of the switching power controller circuit receives a control signal from a third output of the PWM generator.

Figure 3:
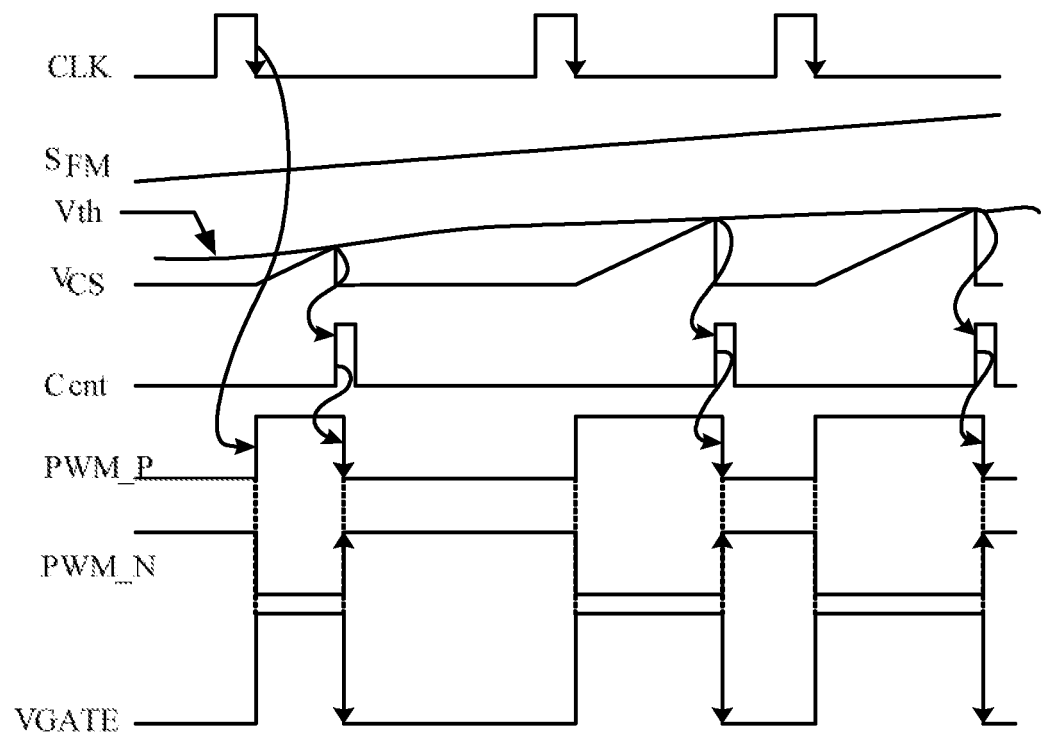
FIG. 3 illustrates a timing diagram for FIG. 2.
Figure 4:
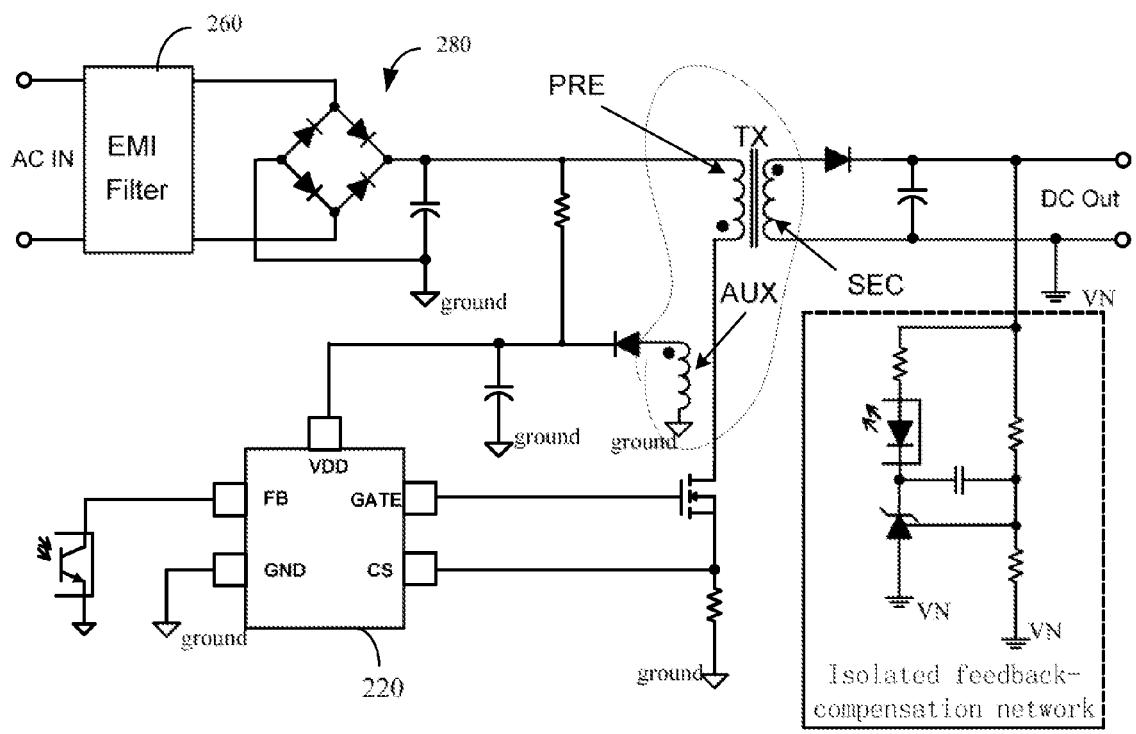
FIG. 4 illustrates a typical flyback SMPS system with feedback of secondary winding of transformer.
Figure 5:
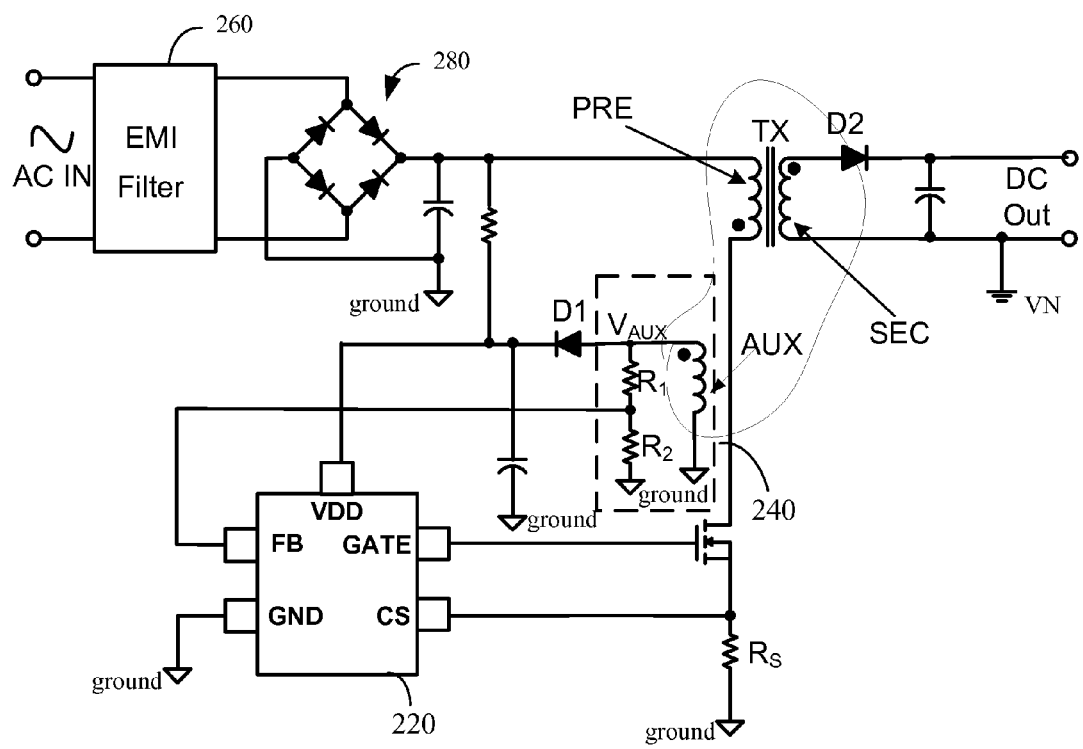
FIG. 5 illustrates a typical flyback SMPS system with feedback of primary winding of transformer.
Figure 8:
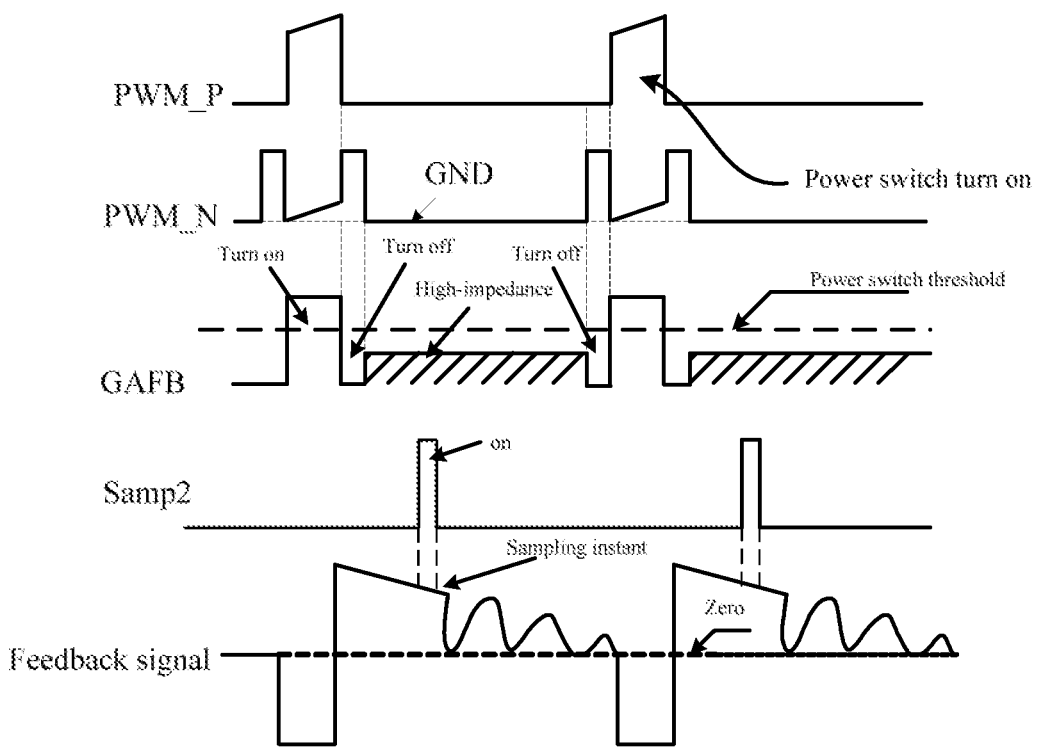
FIG. 8 illustrates operation timing diagram of GAFB pin for controller IC in FIG. 6.

FIG. 8 illustrates the timing sequence of Terminal pin GAFB of the controller IC. Compared to the traditional timing sequence of controller IC illustrated in FIG. 3, the employed controlling timing sequence for signal PWM_N in FIG. 8 is different from that of in FIG. 3. In the traditional control method illustrated in FIG. 3, signal PWM_N and PWM_P is complementary, where the corresponding output of power switch driver includes: "on", "off" two operation state. Wherein during on state, the power switch turns on driven by pin GATE; during off state, the power switch turns off driven by pin GATE. In FIG. 8, signal PWM_N and PWM_P are both at low levels at a certain phase during a cycle, which leads to adding a third output state (high-impedance state, FIG. 8) for power switch driver 626, based on original turning on and turning off state. In FIG. 8, the high-impedance state is located at the period that signals PWM_N and PWM_P are all at a low level. During the high-impedance state, the output port of the power switch driver 626 is set as a high-impedance state while the highest voltage level of pin GAFB of the controller IC 620 is clamped by the feedback signal sampler 630 at a lower level than the threshold of power switch, therefore the power switch (SW) still maintains "off" state. During the high-impedance period, the feedback signal can be set up at pin GAFB and further correctly sampled without interference by control of the feedback sampling controlling signal Samp2 into internal feedback signal sampler 630. As illustrated in FIG. 6, the Samp2 signal is provided by the PWM generator 625. As illustrated in the controlling sequence timing of FIG. 8, the "on" output state of the internal power switch driver 626 is corresponded to the turning on of the power switch (SW); the "off" and high-impedance output state is corresponded to the turning off of the power switch (SW). Therefore, terminal pin GAFB not only applies control signals to the external power switch which is equivalent to that of pin GATE in FIG. 3, but also provides feedback signals similar to pin FB in FIG. 2.

Described above is implementation solution and control method employed for pins-multiplexed of the switching power controller IC in the invention. Based on above solution, with the condition of maintaining original features unchanged, the functions of pins FB and GATE of traditional switching power controller IC in FIG. 2 is combined into the function of pin GAFB illustrated in FIG. 6; the functions of pins VDD, GND and CS is combined into the functions of pins VDD and VSS. The total number of terminal pins is reduced to three from previous five. Meanwhile, the innovated pins-multiplexed solution described in the forgoing description also significantly eliminates the potential risks existing in the system using traditional switching power controller IC. These risks include: accidentally short-circuit occurring between high voltage pins VDD, GATE and low voltage pins CS, FB; latch-up effect potentially caused by negative spike existing between pins CS and GND. The first risk is eliminated by combination of pins FB and GATE into a GAFB pin in the scheme of FIG. 6. The pin connects essentially with internal high-voltage devices, the GAFB is a high voltage pin (same break-down voltage with pin VDD), and therefore, even if the pin is accidentally shorted with VDD, it can survive from the high-voltage-break-down damage. While VSS is the common "Ground" of the controller IC, that is the lowest potential of the IC, its accidental short-circuit with VDD will not damage IC, because of charge stored in capacitor C2 directly discharging to ground instead of to inner of IC. For the second risk, due to combination of pins CS and GND in FIG. 2 into only one pin VSS in FIG. 6, the previous negative spike issue is naturally eliminated.

Another embodiment according to the present invention is a switching mode power supply system (SMPS) comprising a switching power controller circuit described in above paragraphs, a switching power converter, and a feedback network; wherein the switching power converter comprises a power input port, a power output port, a current signal output port, and a switching signal input port; wherein the current signal output port connects to the third terminal pin of the switching power controller and coupled to system ground at least through a resistor; the switching signal input port connects to the second terminal pin of the switching power controller; an input of the feedback network connects to the power output port; an output of the feedback network connects to the second terminal pin of the switching power controller.

Figure 9:
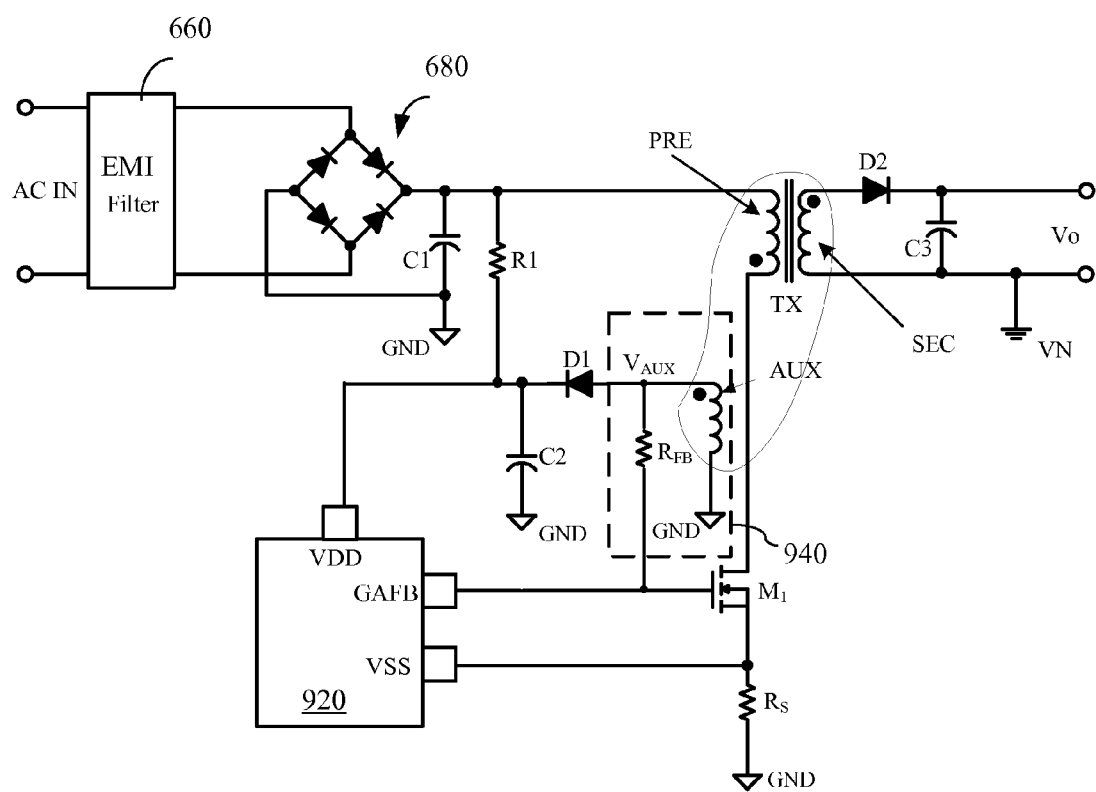
FIG. 9 illustrates a system diagram of one embodiment with controller IC of the present invention.

Illustrated in FIG. 9 is a flyback voltage adapter based on feedback of primary winding. The function of this adapter is to convert AC (alternating voltage 90~260v) to a constant output voltage. FIG. 9 shows the connection relationship between control chip and system from the system aspect. The power controller chip 920 in FIG. 9 has only 3 terminal pins: VDD, GAFB and VSS. Feedback network 940 consists of a feedback resistor RFB and the auxiliary winding AUX of transformer. The power control switch is a MOS power switch M1. Drain and source of the power switch are connected to primary winding PRE of transformer TX and current sensing resistor Rs, respectively. One terminal of the feedback resistor RFB is connected to the auxiliary winding and the other is connected to GAFB pin of control chip together with the gate of MOS switch M1. The third terminal pin of the switching power controller circuit is coupled to a system ground at least through a resistor. As shown in FIG. 9, pin VSS is connected with both resistor Rs and source of power switch M1. Auxiliary winding AUX is used to map secondary winding output voltage and provide electricity energy for control chip when power switch is off.

Figure 10:
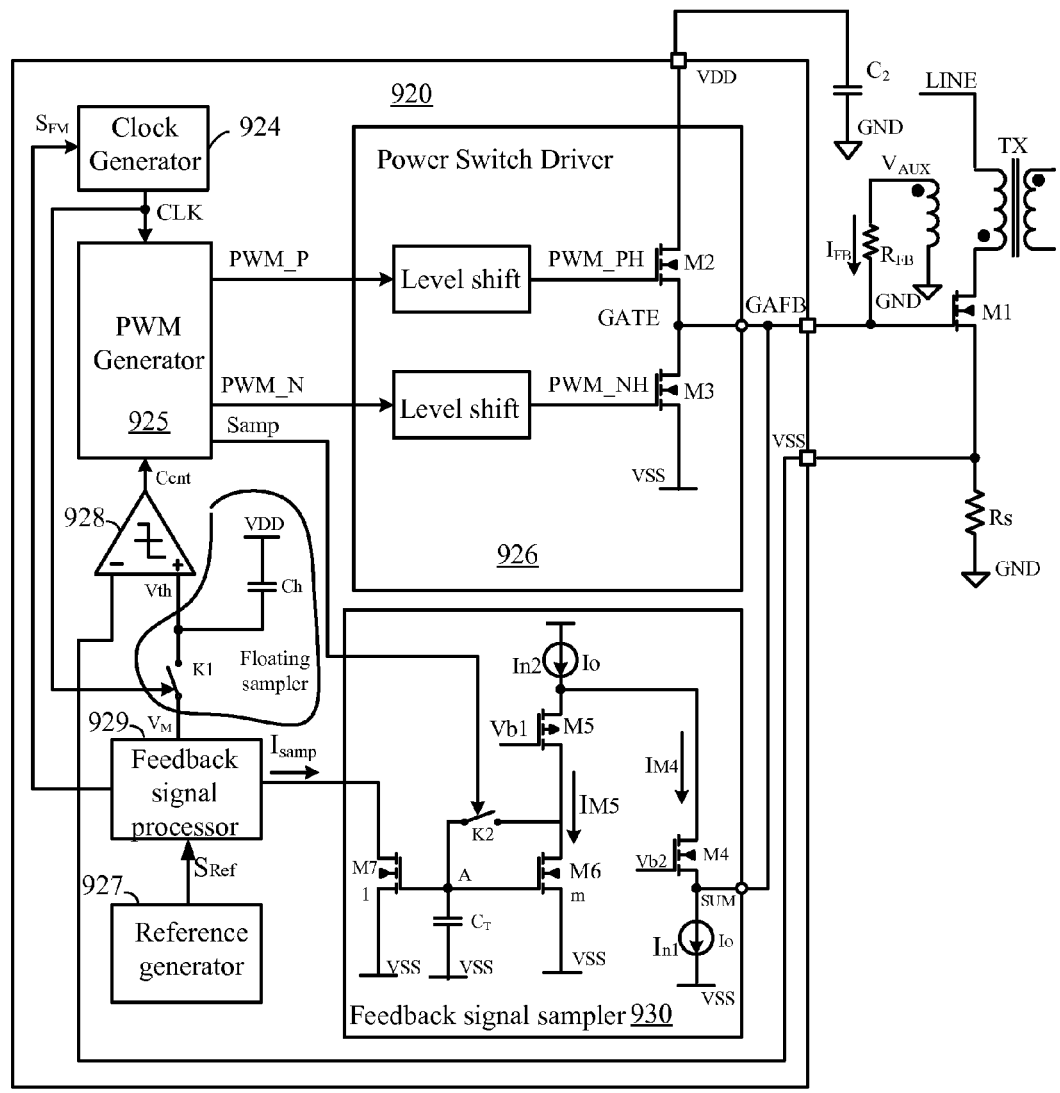
FIG. 10 illustrates a block diagram of a switching power controller IC based on one embodiment of the present invention.

FIG. 10 shows the inner block diagram of switching power controller IC, an embodiment illustrated in FIG. 9 based on the present invention. This switching power control chip 920 contains: a power switch driver 926, a feedback signal sampler 930, a clock generator 924, a PWM generator 925, a PWM comparator 928, a feedback signal processor 929, and a reference 927. Pin GAFB of 920 is connected to GATE point of power switch driver 926 and SUM point of feedback signal sampler 930 inside the control chip. It should be noted that all of the devices connected with GAFB must be high voltage devices since GAFB is a high voltage pin. These devices include: M2, M3 in power switch driver 926; M4 in feedback signal sampler 930 and those in constant current source In1 (connected with GAFB also).

Two path pulse control signals generated by PWM generator, named PWM_P and PWM_N, are sent to power switch driver 926 and then to generate two path output control signals of PWM_PH and PWM_NH after being processed by voltage level shifter in 926. PWM_PH is of the same pulse width and phase as that of PWM_P, but the amplitude and driving capability of PWM_PH is larger than that of PWM_P. It is the same case for PWM_N and PWM_NH. The output stage of power switch driver is comprised of two NMOS driving transistors M2, M3 which are connected in serial. PWM_PH and PWM_NH are used to control the gates of M2, M3, respectively. When the logic level of PWM_P is high and the logic level of PWM_N is low, M2 is on and M3 is off, gate of external power switch M1 is lift up and M1 turns on. When the logic level of PWM_P is low and the logic level of PWM_N is high, M2 is off and M3 is on, the gate of external power switch M1 is pulled down and M1 turns off. When the logic levels of PWM_P and PWM_N are both low, M2 and M3 are both off, as a result, the output of power switch driver is high-impedance. At this time, the voltage level of GAFB can be clamped at a low level by SUM of feedback signal sampler 930. In this instance, output voltage is reflected into AUX of TX and the corresponding voltage is:

$$V_{AUX} = n \cdot (V_o + V_{D2}) \quad (1)$$

Wherein, n is the ration of the number of turns of ratio of auxiliary winding AUX to secondary winding SEC.

$V_{AUX}$ is transferred to feedback current $I_{FB}$ by feedback resistor $R_{FB}$, because of $V_{SUM} \ll V_{AUX}$, the following equation is established.

$$I_{FB} = \frac{V_{AUX} - V_{SUM}}{R_{FB}} \approx \frac{V_{AUX}}{R_{FB}} = \frac{n \cdot (V_o + V_{D2})}{R_{FB}} \quad (2)$$

Figure 11:
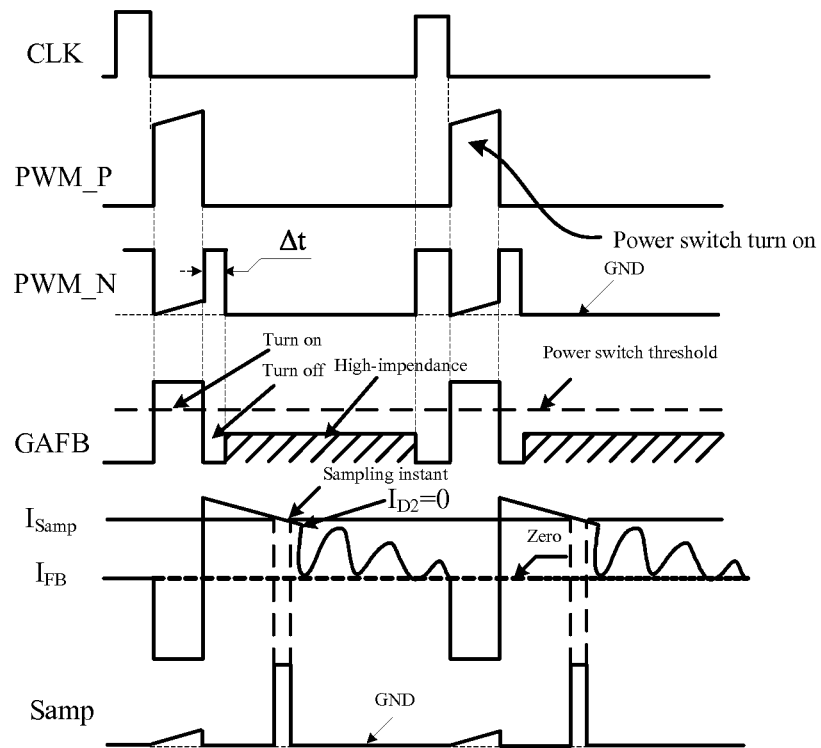
FIG. 11 illustrates operation timing diagram of GAFB pin for controller IC in FIG. 10.

The control timing sequence of pin GAFB in control chip 920 is shown in FIG. 11. As shown, the falling edge of CLK changes the logic level of PWM_P from low to high, and the logic level of PWM_N from high to low. At this time, the power switch driver gives an "on" output and the power switch is turned on. When the logic level of PWM_P changes from high to low triggered by signal Ccnt (FIG. 12), the logic level of PWM_N changes from low to high, the output of the power switch driver is off, and the power switch turns off. After duration Δt, PWM_N turns to a low level controlled by inner circuit, the output GATE of the power switch driver is of a high-impedance. Clamped by M4 (FIG. 10) in feedback signal sampler and current source In1 (FIG. 10), the electric potential is far smaller than the threshold voltage of power switch M1, so M1 keeps off; when rising edge of CLK arrives, PWM_N is triggered to high level, the power switch driver enters into off state again, the power switch remains to be off till the logic level of PWM_P turns high at the next time. After power switch is off, the voltage of secondary winding of TX is reflected to auxiliary AUX, and feedback current $I_{FB}$ is generated by feedback resistor $R_{FB}$. While the power switch driver is in high-impedance state, $I_{FB}$ flows into the net of SUM and substrates constant current $I_o$ to generate current $I_{M4}$. $I_{M5}$ is produced by $I_{M4}$ minus $I_o$:

$$I_{M5} = I_o - (I_o - I_{FB}) = I_{FB} \quad (3)$$

In order to ensure the sampled signal representing the output voltage $V_o$ of FIG. 9, the sampling to $I_{FB}$ must be completed before the de-magnetizing current $I_{D2}$ (in FIG. 9, $I_{D2}$ is the current that flows through D2) of secondary winding of TX becomes zero. In FIG. 11 and FIG. 10, the corresponding relationship between the control signal (Samp) of sampling switch K2 (shown in FIG. 10) and feedback current $I_{FB}$ is shown, where the sampling (at the falling edge of sampling pulse) happens before $I_{D2}=0$. When sampling pulse is high, K2 turns on and M6 becomes a self-biased MOS diode. $I_{M5}$ enters into M6 and generates a self-bias voltage VA at the gate of M6 (node A). $V_A$ can produce eventually a sampling current $I_{samp}$ in M7. When sampling switch is off, the output voltage can be held unchanged by capacitor CT (which can be a MOS capacitor), therefore, $I_{samp}$ keeps constant till the next sampling coming. The relationship between $I_{samp}$ and output $V_o$ is expressed by the following equation:

$$I_{Samp} = \frac{V_{AUX} - V_{SUM}}{mR_{FB}} \approx \frac{V_{AUX}}{mR_{FB}} = \frac{n \cdot (V_o + V_{D2})}{m \cdot R_{FB}} \quad (4)$$

wherein, m is the ratio in W/L of M7 to M6. Isamp represents the output voltage in real time and flows into feedback signal processor 929 to generate two signals: one is the $V_M$ for PWM pulse modulation, the other is $S_{FM}$ for PWM frequency modulation. The value of m corresponding to the case shown in FIG. 11 is equal to 1, but for a different application, m can be set to a different value.

Figure 12:
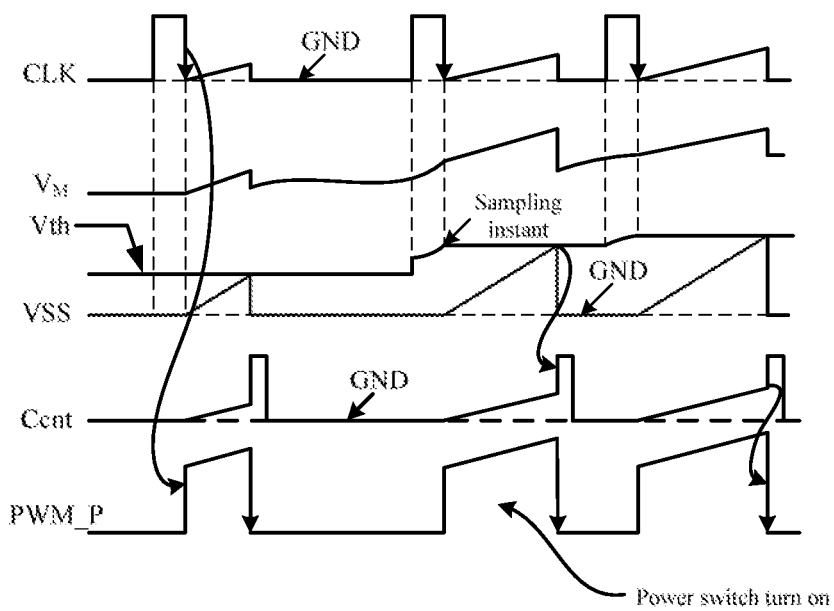
FIG. 12 illustrates operation timing diagram of VSS pin for controller IC in FIG. 10.

FIG. 12 describes the inner control timing sequence of pin VSS in control chip 920 (referred in FIG. 9 and FIG. 10). System clock CLK works as the sampling control signal for floating sampling switch K1. When the level of CLK is high, switch K1 is on, the output node of threshold generator is connected with holding capacitor Ch (Ch can be any kind of capacitor, including MOS capacitor) and the "+" input terminal of PWM comparator 928, the electric potential of holding capacitor is forced to equal to VM that is the output potential of threshold generator (feedback signal processor 929); when CLK signal level is low, switch K1 turns off, at this time, the electric potential of "+" input terminal of 928 is hold by charge stored in Ch, the value of this potential equals to the output of feedback signal processor 929 at the moment of K1 turns-off (the sampling instant). Pin VDD is connected with "ground" through a big capacitor C2, so the diode D1 (referred to FIG. 9) is reverse-biased when power switch M1 is on (PWM_P is positive pulse), and the net current out of C2 is equal to the current through VDD minus the current of resistor R1 (referred to FIG. 9), and its value is about 1 mA for the designed control chip. In general, the duration of switch turn-on is less than 10 μs, and the capacitance of C2 is around 4 μF, to 10 μF. So, during M1 turn-on, the potential drop of C2 is less than 2 mV, it is reasonable to consider the floating reference potential provided by VDD almost constant in the presence of M1 turn-on. The bottom plate (the side of the plate of Ch connected to K1) of capacitor Ch located in the inner circuit has no any discharge path when sampling switch K1 is off, the voltage of Ch can be kept constant when the level of sampling signal CLK is low. As a result, while power switch M1 stays on, though chip ground VSS increases linearly with the current of primary winding of transformer, the input threshold of PWM comparator 928 (equal to floating reference potential minus voltage of Ch at the sampling instant) keeps constant based on the system "ground". When the value of VSS reaches this threshold, PWM comparator generates a control signal Ccnt, which further leads to SW off, the whole PWM control process is equivalent to traditional control. As shown in FIG. 10, feedback signal processor also generates a frequency-modulated signal SFM, SFM is sent to clock generator to modulate system clock signal CLK, and to modulate the frequency of power switch control signal.

Chip pin-multiplexed in the present invention can also be adopted in DC-DC adapter, charger for portable electric device, LED driver, and so on. The followings are the other examples to illustrate Chip pin-multiplexed applications.

Figure 13:
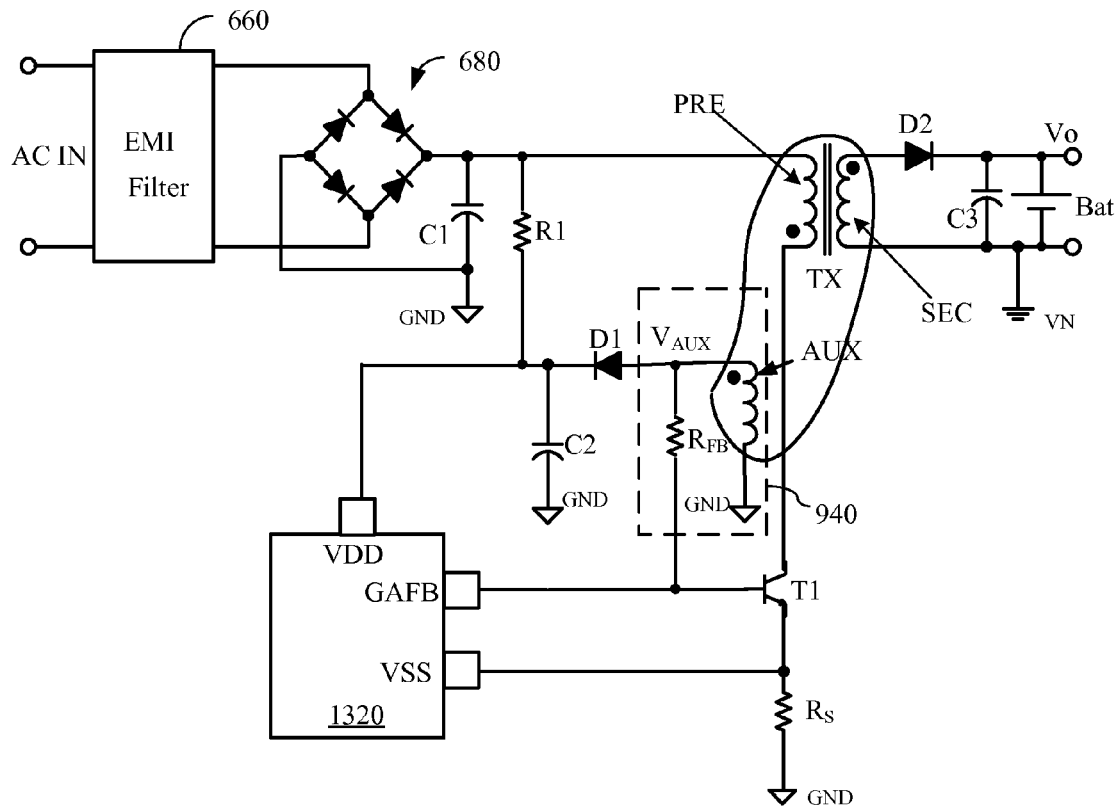
FIG. 13 illustrates a system diagram of another embodiment with controller IC of the present invention.
Figure 14:
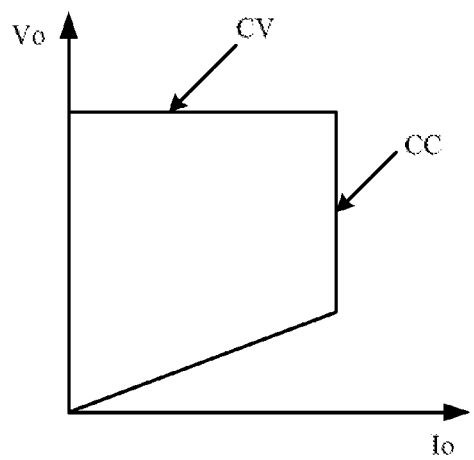
FIG. 14 illustrates a characteristic curve for charger system illustrated in FIG. 13.

One example according to the present invention is a system containing the control chip as shown in FIG. 13. The system configuration is almost the same as that shown in FIG. 10. Control chip 1320 has only 3 pins too, the feedback input and the control output for power bipolar transistor are connected with the same pin GAFB; current control signal is connected to chip "ground" VSS. Differing from the case in FIG. 10, power switch T1 used here is a BJT (Bipolar-Junction Transistor), and the load is a rechargeable battery (Bat), therefore, the example provided here is a battery charger system which satisfies both working modes of CV and CC. So far, most of rechargeable battery for portable device requires charger having two working modes, that is, constant voltage (CV) and constant current (CC). When battery is exhausted, its voltage is generally only one half to one third of nominal output voltage, for this occasion, charger should work in CC mode, which means the battery is charged with a nominal constant current. During CC charging, the battery voltage increases gradually, when this voltage reaches its rating value, charger enters into CV working mode. After that, battery voltage is kept constant at nominal output value, and at the same time charging current becomes very small. FIG. 14 gives the characteristic curve of charger system.

Figure 15:
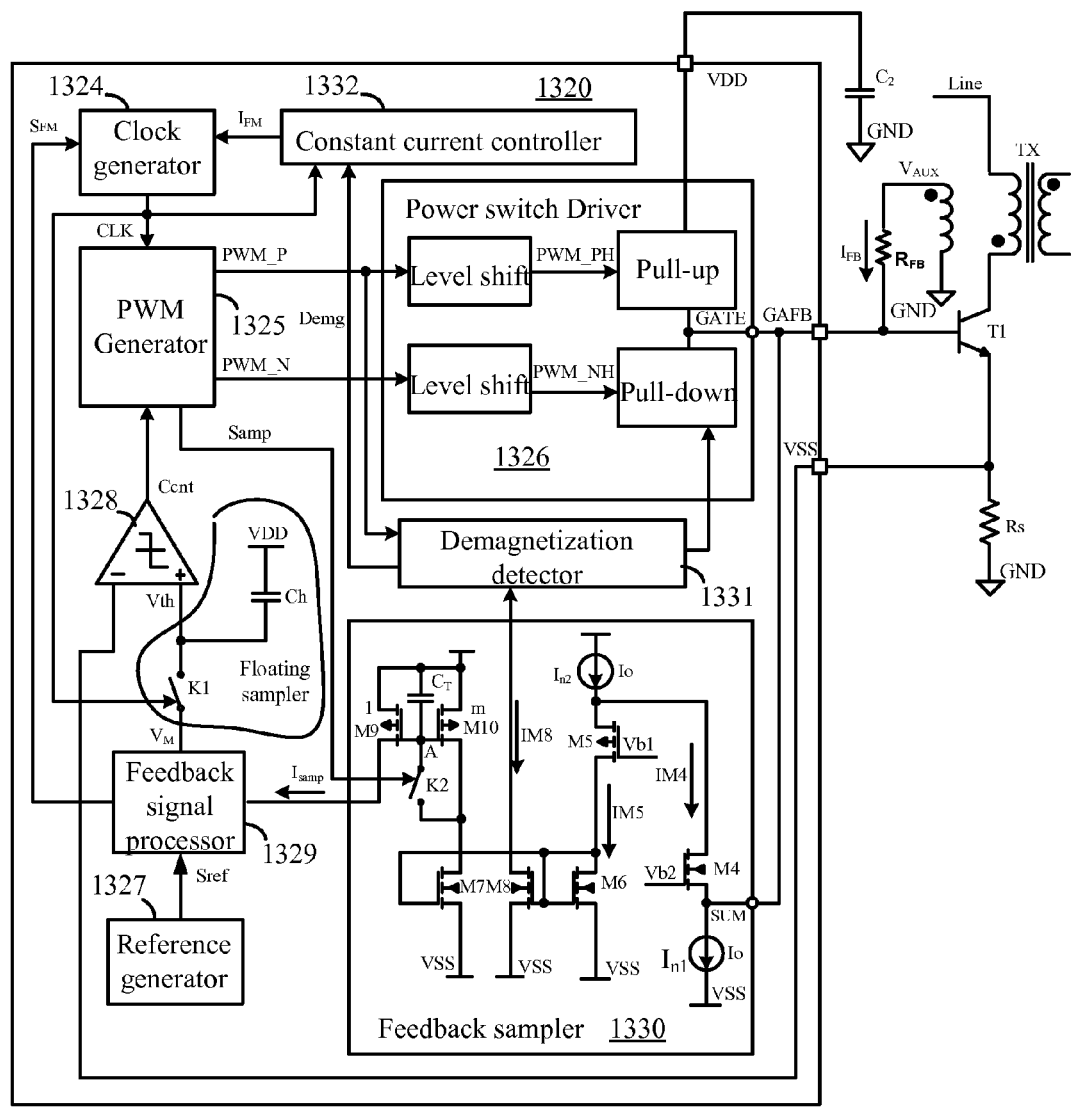
FIG. 15 illustrates a block diagram of a charger controller IC based on the system illustrated in FIG. 13.

FIG. 15 is the inner configuration of charger control chip shown in FIG. 13, an example based on the present invention. Control chip 1320 can realize two working modes of CV and CC. In FIG. 15, 1320 contains: a power switch driver 1326, a feedback signal sampler 1330, a clock generator 1324, a PWM generator 1325, a PWM comparator 1328, a feedback signal processor 1329, a reference generator 1327, a Demagnetization detector 1331 and a constant current controller 1332. Pin GAFB of control chip 1320 is connected to the GATE terminal of power switch driver 1326 and the SUM node (FIG. 15) of feedback signal sampler 1330 inside the chip. It should be noted that all of devices connected directly with pin GAFB must be high voltage device since GAFB is a high voltage terminal, including those in pull-up and pull-down driving circuit, transistor M4 in feedback signal sampler and those contained in constant current source In1.

Two path pulse control signals generated by PWM generator, named PWM_P and PWM_N, are sent to the power switch driver 1326 and then to generate two paths output control signals of PWM_PH and PWM_NH after being processed by voltage level shifter in 1326. PWM_PH is of the same pulse width and phase as that of PWM_P, but the amplitude and driving capability of PWM_PH is larger than PWM_P. It is the same case for PWM_N and PWM_NH. The output stage of power switch driver 1326 is consisted of a pull-up block and a pull-down one. PWM_PH is used to control the pull-up block and PWM_NH controlling the pull-down one. When the level of PWM_P is high, the level of PWM_N is low, the pull-down driving block turns off (high resistive state), the pull-up driving block is enabled to generate the base current for the external power switch T1, and then T1 turns on; when the level of PWM_P is low, the level of PWM_N is high, the pull-up driving block turns off (high resistive state), the pull-down driving one is enabled, the base of external power switch is cut off and turns off. When both the levels of PWM_P and PWM_N are low, pull-up and pull-down driving blocks are off (high-impedance state), at this time, the output of power switch is of high-impedance. Electric potential of pin GAFB is clamped by SUM terminal (FIG. 15) of feedback signal sampler 1330 at a very low level that is far less than the conductance threshold of power BJT switch, so T1 is still off. The output voltage is reflected to AUX, a voltage VAUX is produced:

$$V_{AUX} = n \cdot (V_o + V_{D2}) \quad (5)$$

Wherein, n is the ratio of the number of the turns of the auxiliary winding AUX to the secondary winding SEC.

$V_{AUX}$ is transferred to feedback current $I_{FB}$ by feedback resistor $R_{FB}$, because of $V_{SUM} \ll V_{AUX}$, the following equation is established.

$$I_{FB} = \frac{V_{AUX} - V_{SUM}}{R_{FB}} \approx \frac{V_{AUX}}{R_{FB}} = \frac{n \cdot (V_o + V_{D2})}{R_{FB}} \quad (6)$$

Figure 16:
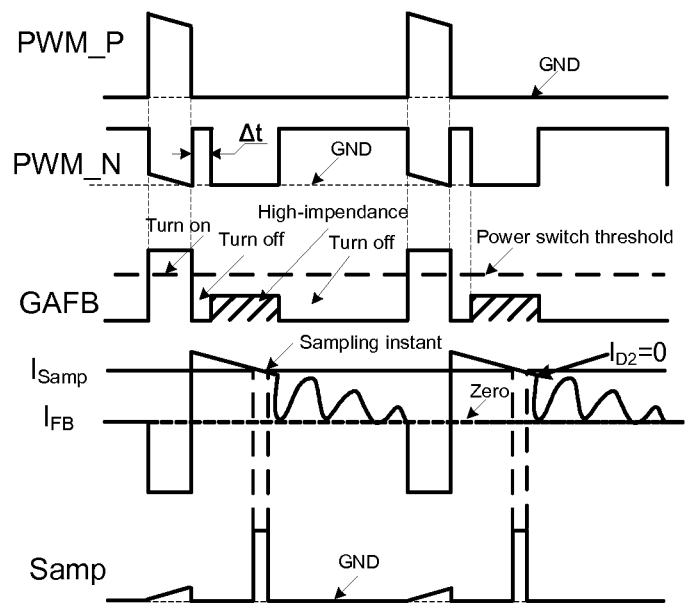
FIGS. 16(a) and (b) illustrates operation timing diagram of GAFB pin for controller IC in FIG. 15.
Figure 16:
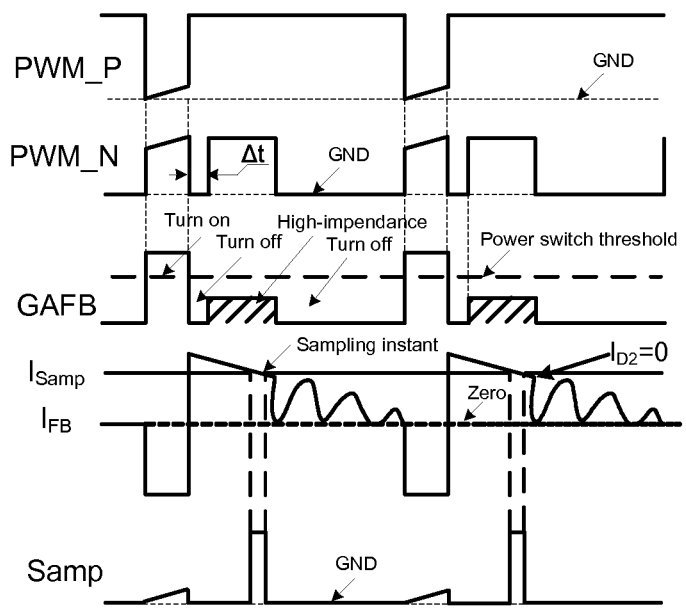

The control timing sequence of pin GAFB in control chip 1320 is shown in FIG. 16(a). As shown, when the level of PWM_P turn from low to high, and the level of PWM_N from high to low, at this time, the power switch driver gives a "on" state, power switch turns on; when the level of PWM_P becomes low from high, the level of PWM_N turns high, the output of power switch driver is in off status, and power switch turns off; lasting for a duration of Δt, PWM_N turns to low level controlled by inner circuit, the output GATE of power switch driver is of high-impedance. Clamped by NMOS M4 in feedback signal sampler and current source In1, the electric potential is far smaller than the threshold voltage of power switch T1, so T1 keeps off; when falling edge of demagnetization pulse-width signal arrives, PWM_N is triggered to high level again, power switch driver enters into off state again, power switch remains to be off till the level of PWM_P turns high at the next time. While power switch driver shown in FIG. 16(a) is in high-impedance state, $I_{FB}$ flows into the net of SUM and substrates constant current $I_o$ to generate current $I_{M4}$. $I_{M5}$ is produced by IM4 minus $I_o$, $I_{M7}$ is equal to $I_{M5}$ by the transferring of current mirror:

$$I_{M7} = I_{M5} = I_o - (I_o - I_{FB}) = I_{FB} \quad (7)$$

In order to ensure the sampled signal representing the output voltage $V_o$ of FIG. 13, the sampling to $I_{FB}$ must be completed before the de-magnetization current $I_{D2}$ (in FIG. 13, $I_{D2}$ is the current that flows through D2) of secondary winding of TX becomes zero. In FIG. 16(a), the corresponding relationship between the control signal (Samp) of sampling switch K2 and feedback current $I_{FB}$ is shown, where the sampling (at the falling edge of sampling pulse) happens before $I_{D2} = 0$.

When control signal level (Samp) of sampling switch K2 is high, K2 turns on and M10 becomes a self-biased MOS diode. $I_{M7}$ enters into M10 and generates a self-bias voltage $V_A$ at the gate of M10 (node A). $V_A$ can produce eventually a sampling current $I_{samp}$ in M9. When sampling switch is off, the output voltage can be hold unchanged by capacitor CT (can be a MOS capacitor), therefore, $I_{samp}$ keeps constant till the next sampling coming. The relationship between $I_{samp}$ and output $V_o$ is expressed by the following equation:

$$I_{Samp} = \frac{V_{AUX} - V_{SUM}}{mR_{FB}} \approx \frac{V_{AUX}}{mR_{FB}} = \frac{n \cdot (V_o + V_{D2})}{m \cdot R_{FB}} \quad (8)$$

wherein, m is the ratio in W/L of M10 to M9. Isamp represents the output voltage in real-time and flows into feedback signal processor to modulate PWM signal. The value of m corresponding to the case shown in FIG. 16(a) is equal to 1, but for different applications, m can be set to different values. $I_{samp}$ is sent to feedback signal processor to generate two signals: one is the $V_M$ for PWM comparator threshold modulation, the other is $S_{FM}$ for clock generator frequency modulation.

It is worth noting that the effective potential can be either at the high level mentioned above or at the low level potential. FIG. 16(a) is the case of high level active, and FIG. 16(b) is low level active.

Figure 17:
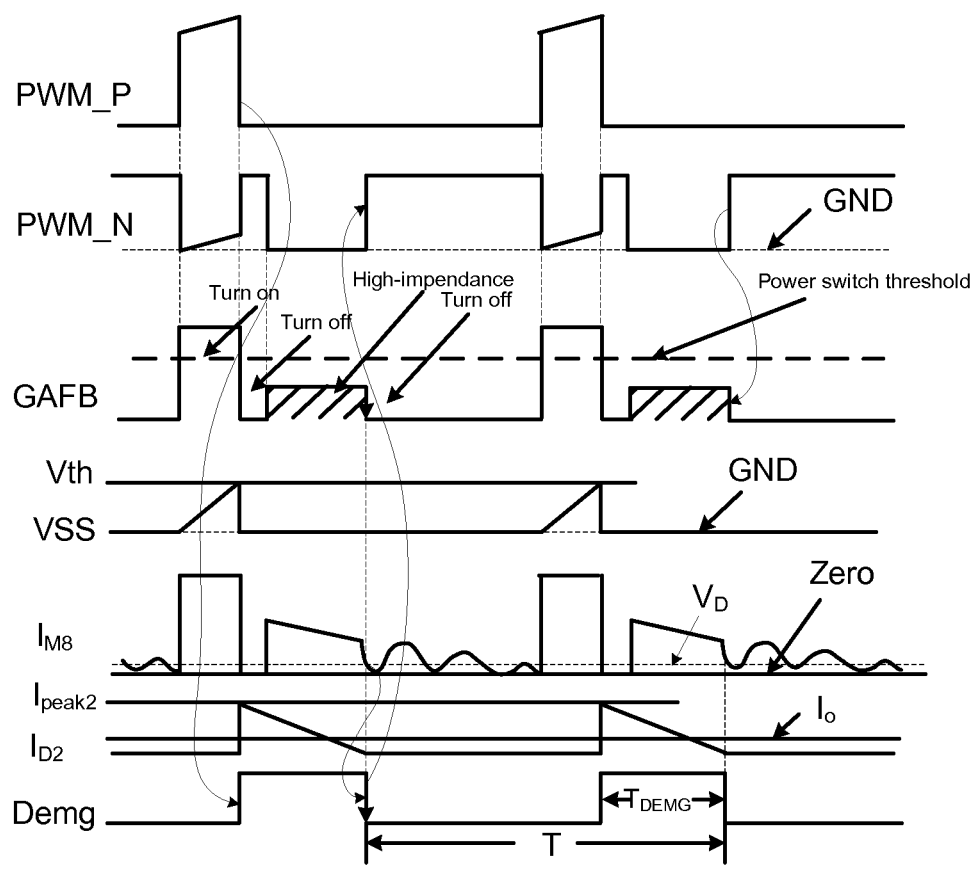
FIG. 17 illustrates a timing diagram of a demagnetization signal Demg generated by charger controller IC illustrated in FIG. 15.

In order to realize CC, it is necessary to sample the demagnetization pulse width. The called demagnetization pulse width is the duration from power switch's turn-off to current $I_{D2}$ of diode D2 in secondary winding of TX attenuating to zero. Demagnetization pulse width is reflected to the voltage signal of AUX and further reflected into the feedback signal $I_{FB}$. When power switch driver stays in high-impedance, $I_{FB}$ flows into the SUM node of feedback signal sampler 1330, at first, $I_{FB}$ works together with $I_o$ to generate $I_{M5}$, and then $I_{M5}$ flows to the current mirror consisted of M6 and M8 to generate $I_{M8}$, $I_{M8}$ is proportional to the current $I_{FB}$ flowing into the node SUM. $I_{M5}$ is sent to demagnetization detector 1331, then 1331 outputs a demagnetization signal Demg by processing $I_{M8}$. FIG. 17 illustrates the timing sequence generated by demagnetization pulse width. As illustrated by FIG. 17, the rising edge of demagnetization signal Demg is triggered by the falling edge of PWM signal, the falling edge of the demagnetization signal is activated by the falling edge of the current $I_{M8}$ at which the current of power diode D2 ($I_{D2}$) (illustrated in FIG. 13) at the secondary winding of the transformer is attenuated to zero, and the triggering threshold of the falling edge of $I_{M8}$ is the $V_D$ in FIG. 17. The demagnetization signal Demg from demagnetization detector is sent to the constant current controller. The signal Demg works with CLK, the other signal sent to CV controller, to generate a signal $I_{FM}$ to control clock generator, which can set a constant proportion between the period T of CLK clock and the pulse width $T_{Demg}$ of demagnetization signal Demg when the output voltage of battery is lower than nominal value. The equation (9) gives the relationship of output current Io to demagnetization pulse width, the period of clock, the turn's ratio of primary winding to secondary wind, and the peak current of primary winding. It is shown that the output current is a constant when $T_{Demg}/T$ is a constant k and $I_{peak}$ is i a constant also (as shown in equation (10)).

$$I_o = \frac{1}{2} \cdot \frac{T_{Demg}}{T} \cdot I_{peak2} = \frac{1}{2} \cdot \frac{T_{Demg}}{T} \cdot \frac{N_p}{N_s} I_{peak} \quad (9)$$

$$I_o = \frac{1}{2} \cdot \frac{T_{Demg}}{T} \cdot \frac{N_p}{N_s} I_{peak} = \frac{1}{2} \cdot k \cdot \frac{N_p}{N_s} I_{peak} \quad (10)$$

Wherein, Np and Ns are the turns of the primary winding and the secondary winding respectively. When output voltage is smaller than nominal value, PWM comparator threshold from the feedback signal processor 1329 in FIG. 15 is a constant, which results in a constant peak current of the primary winding in the period of power switch turning-on. The CV controller set a constant proportion between the period T of CLK clock and the pulse width $T_{Demg}$ of demagnetization signal Demg when the output voltage of battery is lower than nominal value, a constant output current $I_o$ can be obtained. In the entire CC and CV process, the timing sequence employed for VSS pin-multiplexed is as same as the first example.

Changes may be made in the above methods, systems and structures without departing from the scope thereof. For example, in the above embodiments (FIG. 13), the battery load can be replaced by a LED and the system can be reconfigured from a charger driver to a current driver. Also, the power switch in the example system shown in FIG. 13 can be changed to a power MOS switch device. It should thus be noted that the matter contained in the above description and/or shown in the accompanying drawings should be interpreted as illustrative and not in a limiting sense. Accordingly, the invention is intended to embrace all other such alternatives, modifications, and variations that fall within the spirit and scope of the appended claims.

What is claimed is:

1. A switching power controller circuit comprising: a first terminal pin for a high potential of a power supply for the controller circuit, a second terminal pin for providing output of switch drive signals and for receiving feedback signals, and a third terminal pin for receiving external current signals and for a low potential of the power supply;
   wherein said switching power controller further comprises a clock generator, a pulse width modulation (PWM) generator, a power switch driver, a feedback signal sampler, a reference generator, a PWM comparator and a floating sampler;
   said clock generator provides clock signals;
   said PWM comparator outputs PWM triggering signals;
   a first input of the PWM generator is coupled to the clock generator to receive the clock signals and a second input of the PWM generator is coupled to the PWM comparator to receive the PWM triggering signals from the PWM comparator;
   inputs of the power switch driver are coupled to the PWM generator to receive PWM signals and an output of the power switch driver provides switch driving signals to the second terminal pin;
   a first input of the feedback signal sampler receives a feedback signal from the second terminal pin;
   a first input of a feedback signal processor is coupled to the output of the feedback signal sampler to receive sampled feedback signals, a second input of the feedback signal processor receives a reference voltage or reference current from the reference generator, and a first output of the feedback signal processor is coupled to the floating sampler and provides a threshold voltage signal therein;
   a first input of the PWM comparator is coupled to the third terminal pin and a second input of the PWM comparator is coupled to the floating sampler;
   the floating sampler comprises a switch and a holding capacitor; the switch is connected between the output of the feedback signal processor and the second input of the PWM comparator, wherein when the switch is on, the feedback signal processor provides the threshold voltage signal to the second input of the PWM comparator and charges the holding capacitor until the signal level of the switch driving signal output from the power switch driver changes to high; the holding capacitor is connected between the high potential of the power supply and the second input port of the PWM comparator to hold the threshold voltage when the switch is off;
   Wherein the output of the power switch driver is set to a high-impedance state at least for a period when the feedback signal sampler is receiving feedback signal.

2. The switching power controller circuit of claim 1, wherein the first terminal pin is coupled to a system ground through a capacitor.

3. The switching power controller circuit of claim 1, wherein the third terminal pin is coupled to a system ground at least through a resistor.

4. The switching power controller circuit of claim 1, wherein the PWM signal includes a first PWM signal, PWM_P, and a second PWM signal, PWM_N; the logic level of the first PWM signal and the logic level of the second PWM signal are different from each other except when both of them are logic low; the power switch driver is controlled to provide driving signals to the second terminal pin when the logic level of the first PWM signal is high; the feedback signal sampler is controlled to receive feedback signals from the second terminal pin when the logic levels of both the first PWM signal and the second PWM signal are low.

5. The switching power controller circuit of claim 4, wherein the feedback signal sampler receives a control signal from a third output of the PWM generator.

6. The switching power controller circuit of claim 1, wherein the PWM signals include a first PWM signal; the power switch driver is controlled to provide driving signals to the second terminal pin when the logic level of the first PWM signal is high; the clock generator provides a first sampling signal to control the switch; the frequency of the first sampling signal is synchronous with the first PWM signal; when the logic level of the first sampling signal changes from high to low, the logic level of the first PWM signal changes from low to high.

7. The switching power controller circuit of claim 1, wherein a second output of the feedback signal processor outputs a modulation signal to the clock generator to modulate frequency of the PWM signals.

8. The switching power controller circuit of claim 1, wherein the switching power controller circuit is an integrated circuit chip (IC).

9. A switching mode power supply system (SMPS) comprising:

the switching power controller circuit of claim 1, a switching power converter, and a feedback network; wherein the switching power converter comprises a power input port, a power output port, a current signal output port, and a switching signal input port; wherein the current signal output port connects to the third terminal pin of the switching power controller and coupled to system ground at least through a resistor; the switching signal input port connects to the second terminal pin of the switching power controller; an input of the feedback network connects to the power output port; an output of the feedback network connects to the second terminal pin of the switching power controller.

* * * * *